Jan. 5, 1954 F. A. KRUSEMARK 2,665,140
VISOR ASSEMBLY FOR AUTOMOTIVE VEHICLES
Filed June 9, 1950 2 Sheets-Sheet 1
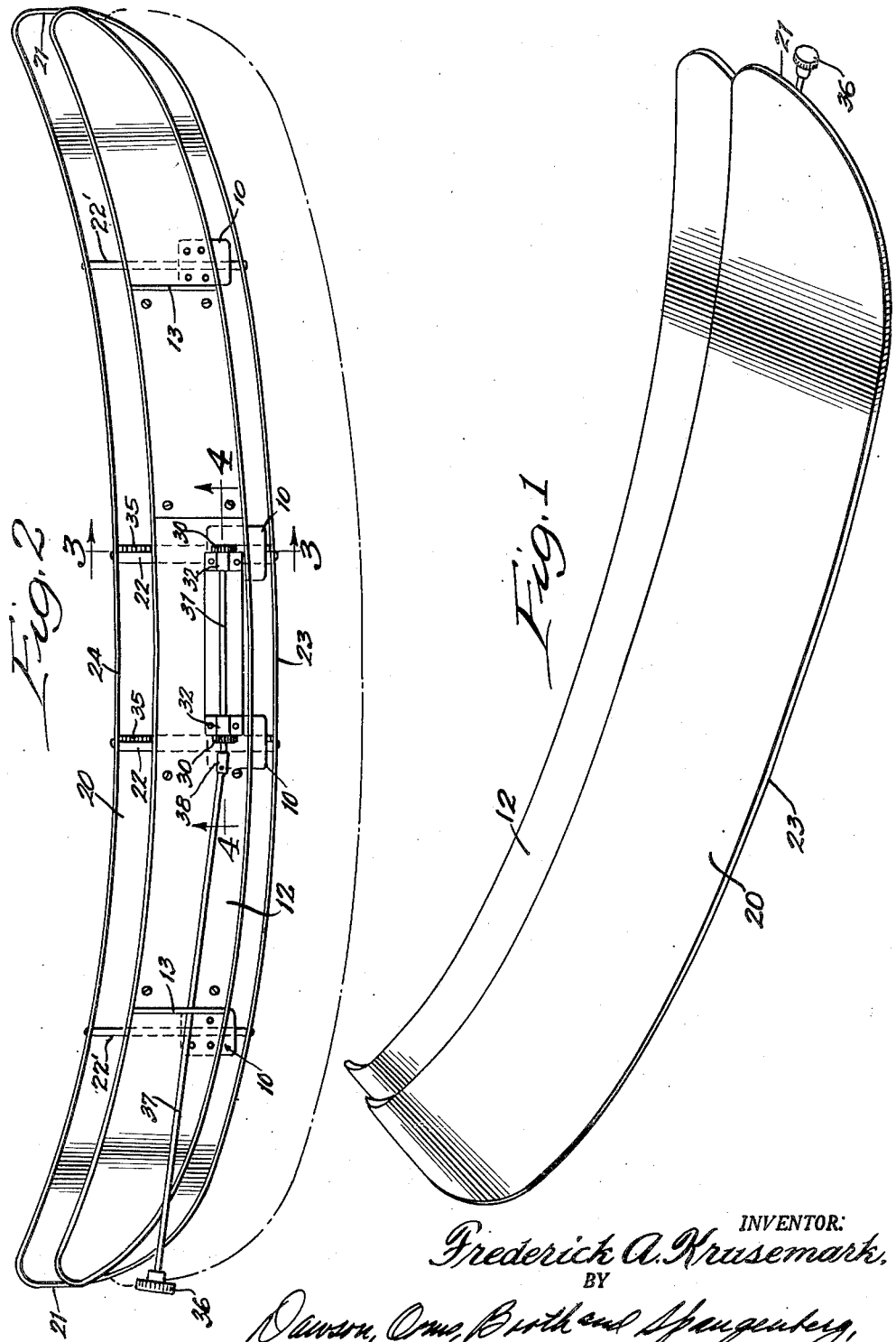
INVENTOR:
Frederick A. Krusemark.
BY
Dawson, Ooms, Booth and Spangenberg,
ATTORNEYS.

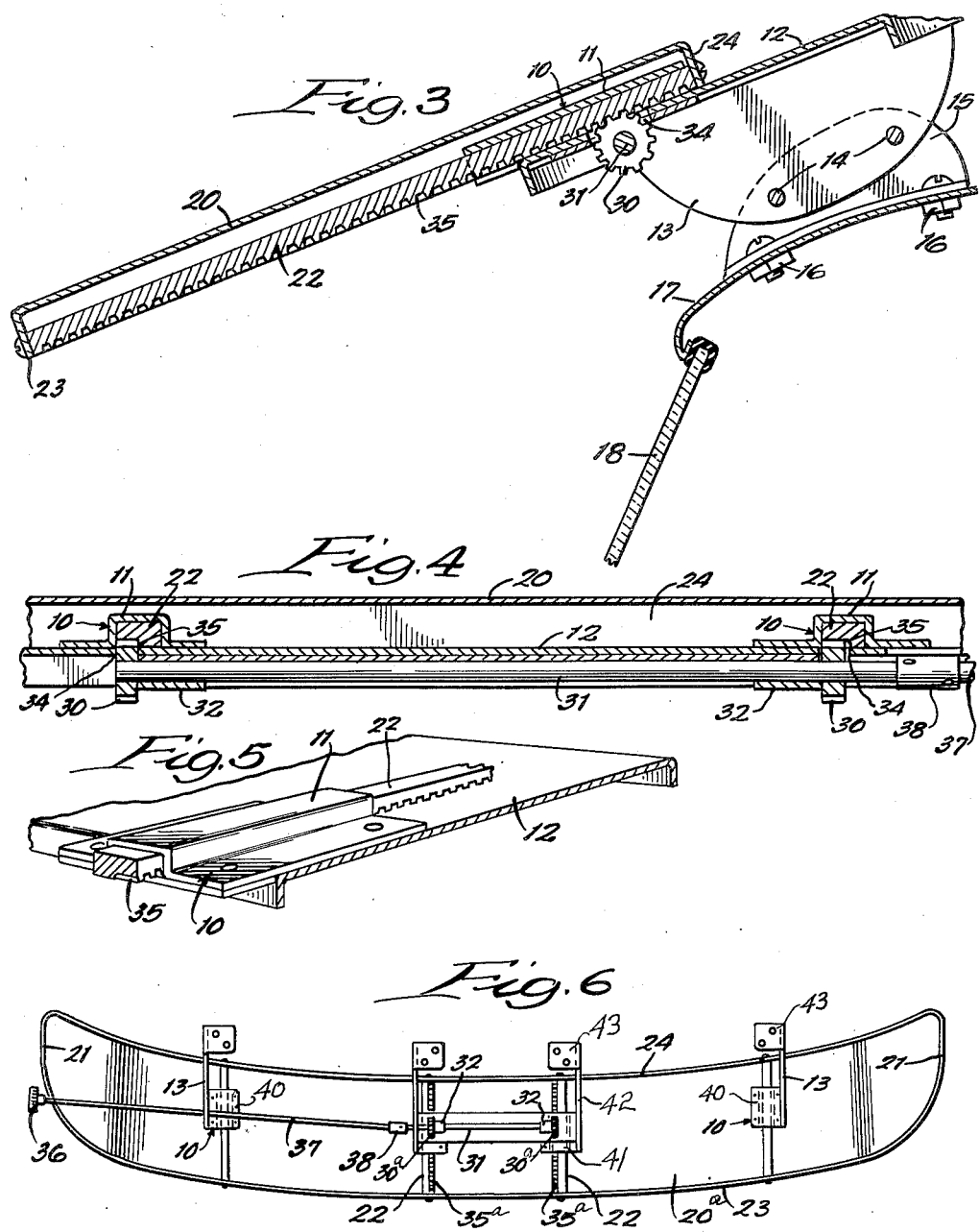

Patented Jan. 5, 1954

2,665,140

UNITED STATES PATENT OFFICE 2,665,140

VISOR ASSEMBLY FOR AUTOMOTIVE VEHICLES

Frederick A. Krusemark, Chicago, Ill.

Application June 9, 1950, Serial No. 167,182

4 Claims. (Cl. 280—95)

This invention relates to a visor assembly in which a movable visor member is mounted for longitudinal adjustment into and out of position of use over the windshield of an automotive vehicle.

An object of this invention is to produce a visor assembly of the type described wherein the visor unit may be adjusted longitudinally and substantially in parallel relation with the windshield between extended and retracted positions of adjustment, and it is a related object to provide a visor assembly of the type described for attachment to the body portion of an automotive vehicle adjacent the upper edge of the windshield.

Another object is to provide a visor assembly for mounting onto the body portion of the vehicle adjacent the upper edge of the windshield and having a visor member which may be longitudinally adjusted into and out of position of use over the windshield in an expedient manner, the visor parts being substantially hidden from view from within the vehicle when out of position of use.

A further object is to produce a visor assembly of the type described which is composed of relatively few simple parts that are easily assembled and attached in position of use on the outside of an automotive vehicle and embodies the contours of streamlined construction characteristic of the present day automobile.

These and other objects and advantages of this invention will hereinafter appear and for purposes of illustration but not of limitation, an embodiment of the invention is shown in the accompanying drawings in which:

Figure 1 is a perspective view of the visor assembly embodying features of this invention, shown separately and apart from the automotive vehicle;

Figure 2 is a plan view of the visor assembly shown in Figure 1 taken from the under side and indicating by broken lines the positions which the movable element may assume;

Figure 3 is a sectional view taken along the lines 3—3 of Figure 2, but showing the movable visor element in extended position;

Figure 4 is a sectional view taken along the lines 4—4 of Figure 2;

Figure 5 is a fragmentary view in section showing the arrangement of parts which include the actuating mechanism of the guide elements, and Figure 6 is a plan view of a modification in a visor assembly embodying features of this invention.

The concepts of this invention are embodied in a visor assembly comprising a number of guide elements fixed in laterally spaced apart relation across the top of the vehicle adjacent the upper edge of the windshield. Each guide element, which is longitudinally arranged and preferably sloped downward in the direction of the windshield is operatively engaged by a rod or bar secured in corresponding arrangement in an elongate visor member formed of sheet metal, plastics or like relatively rigid sheet material. Thus the visor member is capable of guided longitudinal movement responsive to actuation by manually or otherwise operated means between an extended position of adjustment wherein the major portion of the visor member is disposed in advance of the guide elements, and a retracted position of adjustment wherein the major portion of the visor member is disposed rearwardly of the forward edge portion of the guide elements. In the latter position the entire assembly is substantially concealed from view of the driver or others seated within the vehicle.

As shown in the drawing, the guide elements 10 may comprise a plurality of channel shaped members 11 secured in laterally spaced apart relation onto the upper wall of an elongate frame member 12 formed of sheet metal or like rigid material which may be curved to conform generally to the contour of the adjacent body portion of the vehicle. The frame member 12 is supported in spaced apart relation with the top of the vehicle to permit free passage of air therebetween and for such purpose the frame member is provided with two or more depending flanges 13 which are secured, as by bolt members 14, to upright brackets 15 fixed as by bolt and nut means 16 to the dome 17 of the vehicle in the region just above the windshield 18. It will be understood that other securing means may be employed without departing from the spirit of the invention.

Shiftable lineally in a longitudinal direction relative to the guides 10 and substantially in parallel relation therewith is an elongate visor member 20 formed of sheet material, such as metal, glass, plastics and the like and having a curvilinear contour which conforms to the streamlined compound curvature of the vehicle. When the visor member 20 is formed of a narrow lengthwise dimension compound curvature is relatively unimportant, but the end portions 21 may be rounded for streamlining effect. Rods or bars including an inner pair of rack bars 22 and an outer pair of bars 22' having the same spaced relation and arrangement of the guide elements 11 are fixed to the visor member but in spaced relation therewith. It is preferable to secure the bars between down-turned flanges 23 and 24 integral with the forward and rearward edge portions of the visor member. Each bar or rod is adapted to be slidably disposed within a corresponding channel member 11 and to cooperate therewith to guide the movement of the visor member 20 in the longitudinal direction.

Although various means may be provided for adjusting the visor member longitudinally relative to the frame 18 between extended and retracted positions of adjustment, a preferred actuating means includes a pinion 30 mounted on a shaft 31 rotatably carried by brackets 32 secured to the underside of the frame 12. The pinion extends through an opening 34 provided in the upper wall of the frame member in order to enable operative engagement with rack teeth 35 formed in the underside of the rod or bar 22 rigid with the visor member 20. In order to minimize binding, it is best to provide two or more laterally spaced pinions mounted upon a common shaft for operative engagement with correspondingly spaced apart rack bars 22 disposed in the central portion of the visor assembly. The shaft 31 upon which the pinions are mounted may be rotated by a knob 36 secured onto the end of an elongate rod 37 which is connected at the inner end to the shaft 31 through a type of universal coupling 38. The rod may extend through an opening provided in the flange 13 to support the rod in position of use.

In operation, the visor member 20 may be retracted to the position shown by solid lines in Figure 2 whereby the visor assembly is disposed rearwardly of the upper edge of the windshield 18 so as to be substantially completely hidden from view from within the vehicle. When it is desired to project the visor member over the windshield to cut off disturbing light rays, the knob 36 may be turned in the direction indicated by the arrow in Figure 2, whereupon the visor member is shifted lineally in the forward direction responsive to the action between the operated pinions 31 and the rack bars 22. The visor member may be projected forwardly until the pinion engages the rearmost teeth in order to adjust the visor member to the position shown by broken lines in Figure 2. In this position, sufficient contact remains between the frame member and the visor member to resist inadvertent separation or excessive vibration by wind forces operating during normal use. In order to achieve maximum travel of the visor member, it is best to locate the guide members 10 and the pinions 30 in the forward portion of the frame.

It will be understood that the concepts of this invention may be practiced without the necessity of employing a frame member of the type described so long as two or more guide elements 40 and/or brackets 41 are provided to be fixed in the desired laterally and vertically spaced apart relation and longitudinal arrangement across the top wall of the vehicle. When a system of this type is employed, the outer members, if used, may merely constitute guide members, while the central innermost members may be provided with pinions 30a operating therethrough for engagement with rack bars 35a to effect the desired longitudinal adjustment of the visor member 20a upon actuation, as shown in Figure 6 of the drawings. Each guide element or bracket may be connected by posts 42 to pads 43 which are adapted to be fixed to the roof of the vehicle.

Adjustment of the shiftable visor member may be effected manually, whether or not cooperating rack and pinion means form a part of the assembly. It will be easier to achieve manual adjustment with the use of the described cooperating guide members so long as means are provided for locking the parts in their adjusted position.

It will be further understood that the rodlike members or bars 22 may form a part of the fixed frame member while the channels or guides cooperating therewith may be fixed, in turn, to the shiftable or adjustable visor member and that numerous other changes in the details of construction arrangement and operation may be made without departing from the spirit of the invention, especially as defined in the following claims.

I claim:

1. A visor assembly mounted for longitudinal adjustment over the windshield of an automotive vehicle comprising a stationary visor member extending substantially across the width of the windshield and fixed in vertically spaced apart relation to the vehicle body above the upper edge portion of the windshield and the top of the vehicle and inclined downwardly in the direction of said windshield, elongate guide members fixed to a surface of said stationary visor member in laterally spaced apart parallel relation and having downward inclination therewith, a movable visor member having substantially the same lateral dimension as the stationary visor member and conforming substantially therewith, guided elements fixed to said movable visor member in laterally spaced apart relation corresponding to the elongate guides for operative connection therewith to guide the movable visor member during longitudinal movement relative to the stationary visor, rack teeth in some of said guided elements, pinions rotatably mounted on said stationary visor member in meshing relation with the rack teeth of said guided elements, a laterally extending shaft interconnecting each of the pinions for conjoint movement, and means alongside the visor members for turning said shaft to actuate the movable visor member relative to the stationary visor member in the longitudinal direction.

2. A visor assembly having a portion thereof longitudinally shiftable between retracted and extended positions over the windshield of an automotive vehicle comprising an elongate stationary visor member fixed in spaced relation to and above the top of the automotive vehicle across the upper edge portion of the windshield, longitudinally extending guides fixed to the stationary visor member in laterally spaced apart parallel relation, an elongate visor member having a contour corresponding substantially to the stationary visor member and mounted for shifting movement longitudinally relative thereto, guide receiving elements fixed to said movable visor member in corresponding parallel spaced relation for establishing a guiding connection between said stationary and movable visor members, and actuating means separate and apart from said guide elements for adjusting the movable visor to between retracted and extended positions of adjustment.

3. A visor assembly having a stationary member and a separate member longitudinally shiftable between retracted and extended positions over the windshield comprising an elongate visor member stationarily fixed to the automotive vehicle in spaced relation above the top thereof across the upper edge portion of the windshield, longitudinally extending guides fixed to said stationary visor member in laterally spaced apart parallel relation, an elongate movable visor member having a contour corresponding substantially to that of the stationary visor member and shiftable relative thereto between extended and retracted positions, guide receiving elements fixed to said movable visor member for maintaining guiding relation between said movable visor member and stationary visor member during movement between extended position wherein the major portion of the movable visor member extends over the windshield in front of said stationary visor member and retracted position wherein the major portion of said movable visor member is lapped by said stationary visor member, and actuating means for shifting the movable visor member longitudinally relative the stationary visor member between extended and retracted positions of adjustment.

4. A visor assembly having a stationary portion and a movable portion shiftable longitudinally between retracted and extended positions over the windshield of an automotive vehicle comprising an elongate stationary visor member secured above the top of the automotive vehicle in spaced relation therewith and above the upper edge of the windshield, channel members fixed in longitudinal arrangement and in parallel spaced apart relation to the stationary visor member, an elongate visor member having a contour corresponding substantially to the stationary visor member and mounted for shifting movement longitudinally relative thereto between extended and retracted positions, rods for each channel member fixed to said movable visor member in an arrangement corresponding to that of the channel members and operable therein for establishing a guiding relation between the visor members, and separate means for shifting the movable visor member longitudinally relative the stationary member between extended and retracted positions.

FREDERICK A. KRUSEMARK.

References Cited in the file of this patent

UNITED STATES PATENTS

| Number | Name | Date |
|---|---|---|
| 1,930,002 | Cunningham | Oct. 10, 1933 |
| 2,334,856 | Atkinson | Nov. 23, 1943 |
| 2,458,918 | Rea | Jan. 11, 1949 |
| 2,528,903 | Nichols | Nov. 7, 1950 |
| 2,538,384 | Sauer | Jan. 16, 1951 |

FOREIGN PATENTS

| Number | Country | Date |
|---|---|---|
| 298,500 | Great Britain | Oct. 2, 1928 |